(12) United States Patent
Sakamaki

(10) Patent No.: US 8,428,208 B2
(45) Date of Patent: Apr. 23, 2013

(54) CONTROL CIRCUIT, INFORMATION PROCESSING DEVICE, AND METHOD OF CONTROLLING INFORMATION PROCESSING DEVICE

(75) Inventor: Hideyuki Sakamaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 820 days.

(21) Appl. No.: 12/624,458

(22) Filed: Nov. 24, 2009

(65) Prior Publication Data

US 2010/0228956 A1    Sep. 9, 2010

(30) Foreign Application Priority Data

Mar. 6, 2009   (JP) .................................. 2009-52805

(51) Int. Cl.
*H04L 7/00*    (2006.01)

(52) U.S. Cl.
USPC .......................................... 375/356; 375/216

(58) Field of Classification Search .................. 375/356, 375/211, 213, 212, 220, 377
See application file for complete search history.

(56) References Cited

U.S. PATENT DOCUMENTS 7,464,301 B1 * 12/2008 Entezari et al. .................. 714/45
2002/0112190 A1 * 8/2002 Miyagawa et al. ........... 713/201

FOREIGN PATENT DOCUMENTS

| JP | H05-003494 | 1/1993 |
| JP | H11-345150 | 12/1999 |
| JP | 2001-147883 A | 5/2001 |
| JP | 2006-31199 | 2/2006 |

* cited by examiner

*Primary Examiner* — Kevin Kim
(74) *Attorney, Agent, or Firm* — Fujitsu Patent Center

(57) ABSTRACT

A control circuit for receiving data transmitted by a data transmitting circuit and transmitting the received data to a data receiving circuit includes: a data receiving unit for receiving the data transmitted by the data transmitting circuit; a packet analyzing unit for judging whether the data received from the data transmitting circuit is a packet including history acquisition information and reading the history acquisition information from the received data; a history acquisition executing unit for starting or stopping acquiring the history information of the transmission and reception of the data according to the history acquisition information read by the packet analyzing unit to store the history information acquired; and a data transmitting unit for transmitting the packet including the history acquisition information or a packet other than the packet including the history acquisition information to the data receiving circuit.

10 Claims, 8 Drawing Sheets

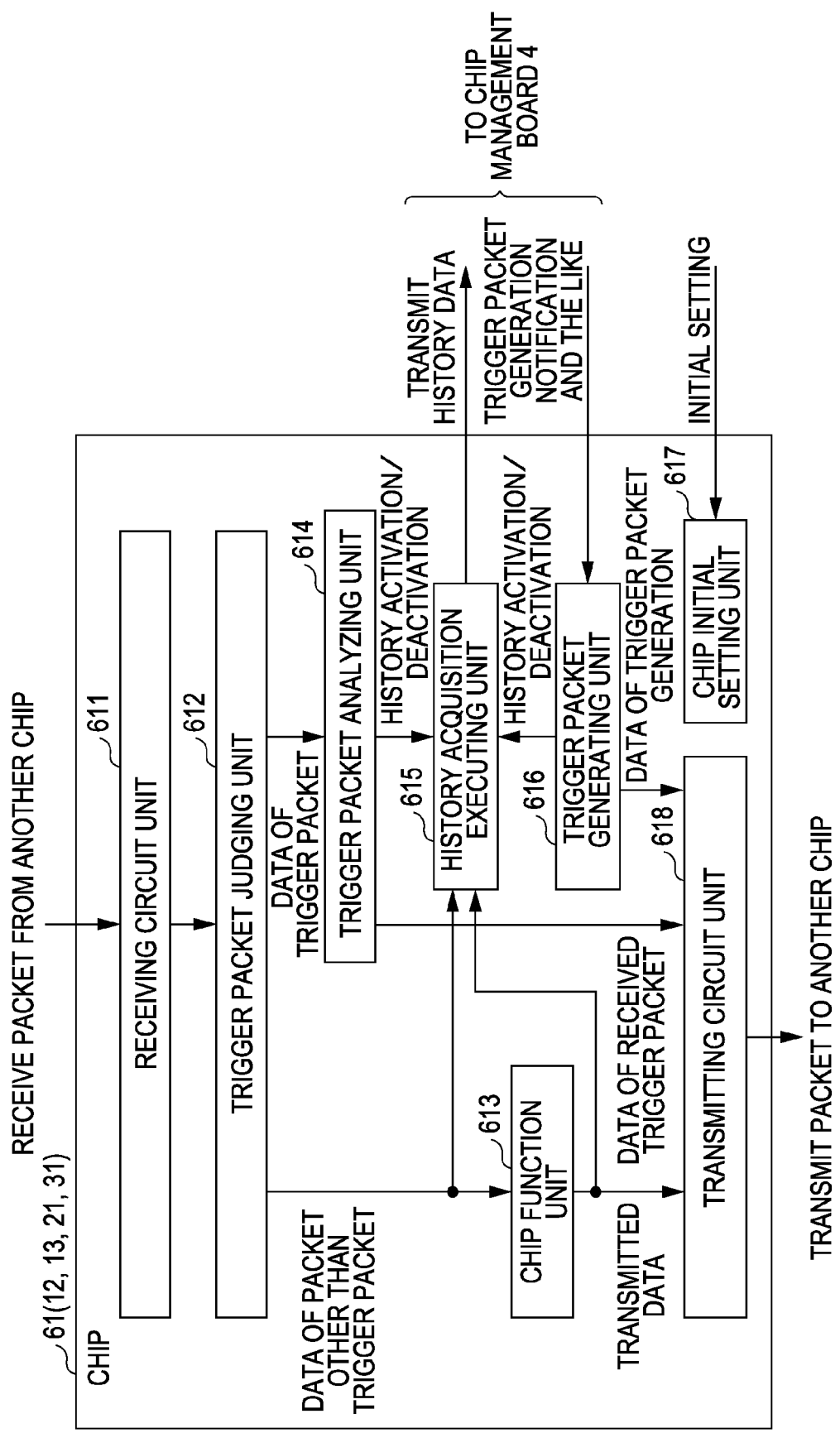

FIG. 3

| NUMBER OF STAGE/bit | 0 | 1 | 2 | 3 | 4 | 5 | 6 | 7 | 8 |
|---|---|---|---|---|---|---|---|---|---|
| FIRST STAGE | | | | HEADER BIT | | | | | PARITY |
| SECOND STAGE | BOARD TYPE OF STARTING POINT | | | | BOARD NUMBER OF STARTING POINT | | | | PARITY |
| THIRD STAGE | CHIP NUMBER OF STARTING POINT | | | | | | | | PARITY |
| FOURTH STAGE | HISTORY OF TRANSMISSION POINT OF STARTING POINT | | | | HISTORY OF RECEPTION POINT OF STARTING POINT | | | | PARITY |
| FIFTH STAGE | BOARD TYPE OF ENDING POINT | | | | BOARD NUMBER OF ENDING POINT | | | | PARITY |
| SIXTH STAGE | CHIP NUMBER OF ENDING POINT | | | | | | | | PARITY |
| SEVENTH STAGE | HISTORY OF TRANSMISSION POINT OF ENDING POINT | | | | HISTORY OF RECEPTION POINT OF ENDING POINT | | | | PARITY |
| EIGHTH STAGE | HISTORY START/STOP | | | | | | | | PARITY |
| NINTH STAGE | HISTORY ACQUISITION PACKET TYPE | | | | | | | | PARITY |
| TENTH STAGE | ERROR BIT CORRECTION | | | | | | | | PARITY |

BIT DEFINITION OF DATA ~71

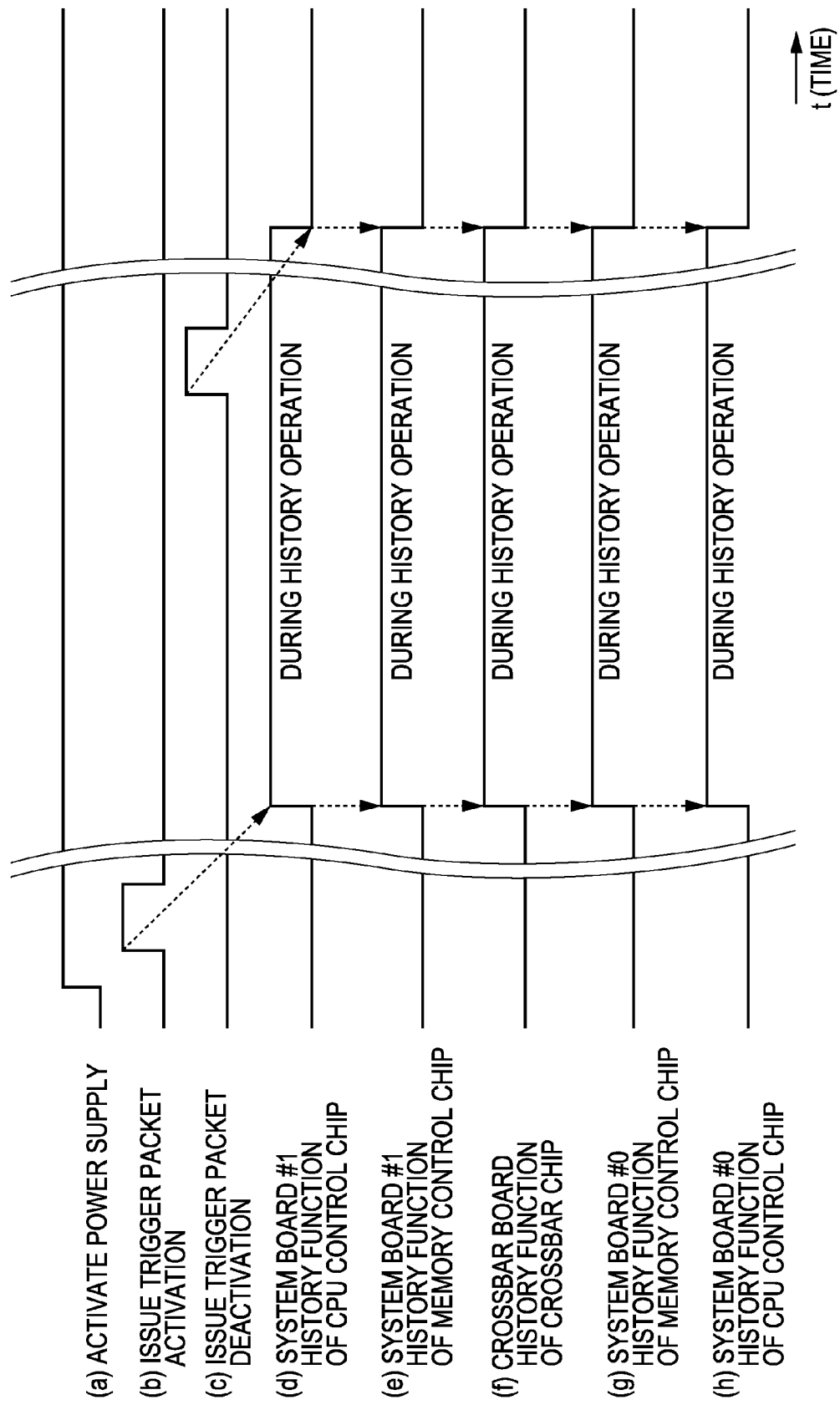

CONTROL CIRCUIT, INFORMATION PROCESSING DEVICE, AND METHOD OF CONTROLLING INFORMATION PROCESSING DEVICE

CROSS-REFERENCE TO RELATED APPLICATION

This application is based upon and claims the benefit of priority of the prior Japanese Patent Application No. 2009-52805, filed on Mar. 6, 2009, the entire contents of which are incorporated herein by reference.

FIELD

The embodiments discussed herein are related to a control circuit, an information processing device, and a method of controlling the information processing device.

BACKGROUND

An information processing device adopting a multi CPU system having a plurality of central processing units (CPUs) as arithmetic processing units performs error detection of data in data transmission and reception between chips (e.g., LSIs) as semiconductor devices provided on a board thereof. Thus, reliability of the multi CPU system is improved. Also, the information processing device adopting the multi CPU system collects history information of the transmission and reception of the data to analyze. Thus, serious breakdown and failure are prevented and maintenance is rapidly performed against the breakdown.

Meanwhile, in a computer-to-computer data distributing system, there is proposed trace executing means and the like to trace a data packet transmitted over a network when receiving trace start request from a transmission side computer until receiving a trace stop notification.

Also, in a private exchange device capable of performing a packet trace of a specified line, there is proposed maintenance operation means and the like for receiving a packet trace registration request command and a packet trace data output request command from input/output means.

Also, as a trace method, there is proposed a trace method to select a type of data from a plurality of types of data generated by executing a predetermined function to collect data of a selected type as a trace target.

Further, in a large-scale system, there is proposed holding means and the like for holding partition information used for an interface to which a crossbar device is connected in each of a plurality of ports for connection to the outside in the crossbar device.

FIGS. 7 and 8 are views for illustrating a process of a history function which was studied by the present inventor. Hereinafter, the process of the history function in the information processing device of the multi CPU system having a plurality of system boards #0 and #1, a crossbar board, and a chip management board is described.

FIG. 7 is a view illustrating operation timing of the history function of the information processing device in an example in which a CPU #3 of the system board #1 requests to read a memory of the system board #0, and thereafter a CPU control chip of the system board #1 transmits a packet to the system board #0.

In FIG. 7, (za) is an example of timing to activate a power supply of the information processing device, and (zb) and (zc) are examples of timing to issue activation and deactivation of the history function from the chip management board. Also, (zd) to (zh) are examples of operation timing of the history function of each chip.

Assume that an error of the data occurs in a main bus of the information processing device after activating the power supply (a rising edge of a square wave) of the information processing device (za). When a user recognizes the error, the user performs an error analyzing operation by a personal computer (PC) in order to specify an error cause. In this case, the user recognizes that the packet error is generated in the analyzing operation by the PC, and instructs a chip management board to issue an activation instruction of the history function to each chip via the PC.

The chip management board issues (transmits) the activation instruction of the history function to the CPU control chip of the system board #1 according to setting of the PC. Subsequently, the chip management board issues the activation instruction of the history function in the order of a memory control chip of the system board #1, a crossbar chip of the crossbar board, a memory control chip, and the CPU control chip of the system board #0 (the rising edge of each square wave in zb).

Each chip, which has received the activation instruction of the history function from the chip management board, activates the history function (the rising edge of the square wave in (zd) to (zh)). That is, each chip stores the history information such as a destination, a recipient, a time, and a packet type when transmitting and receiving the packet transmitted and received via the main bus in a memory for history. The chip management board issues (transmits) a deactivation instruction of the history function to each chip when receiving the error detection notification of the packet from any chip, for example, after issuing the activation instruction of the history function (the rising edge of each square wave in (zc)). Meanwhile, the memory for history is generally the memory of a small capacity. Therefore, for example, until the instruction of the activation stop is issued, each chip rewrites the memory for history with newest history information when the history information exceeds the capacity of the memory for history to thereby store the newest history information.

FIG. 8 is a view illustrating an example of a process flow of the history function in a case where the CPU control chip of the system board #1 transmits the packet to the system board #0 after the CPU of the system board #1 requests a read instruction of the memory of the system board #0.

The chip management board transmits the activation instruction of the history function to the memory control chip of the system board #0 via a history control wiring (S111). The memory control chip of the system board #0, which receives the activation instruction, activates the history function.

The CPU #3 of the system board #1 performs data request of the memory of the system board #0 (S112). The CPU control chip of the system board #1 transmits the packet to the crossbar chip via the main bus (S113). The crossbar chip transmits the packet to the memory control chip of the system board #0 via the main bus (S114).

The memory control chip of the system board #0 detects the data error of the packet (S115). The memory control chip of the system board #0 notifies the chip management board of the data error via the history control wiring (S116).

In response to the error notification, the chip management board transmits the deactivation instruction of the history function to the memory control chip of the system board #0 via the history control wiring by the chip management unit (S117). The memory control chip of the system board #0, which has received the deactivation instruction of the history function, transmits the history information stored in the memory for history to the chip management board (S118).

Meanwhile, although not described above, assume that the chip management board also issues the activation and deactivation instructions of the history function to other chips via the history control wiring as in the above-described case to collect the history information. According to this, the user may access the history information collected by the chip management board via the PC and use the collected history information to analyze a cause of the error occurrence of the information processing device.

However, according to the study by the present inventor, the chip management board notifies each chip of the activation and deactivation instructions of the history function of each chip via the history control wiring to control in the process of the history acquisition illustrated in FIGS. 7 and 8. Therefore, the following problem occurs.

In the information processing device which has been studied by the present inventor, the chip management board issues the activation or deactivation instruction of the history function to the chip, which collects the history information, via the history control wiring, in order to collect the history information. Each chip, which has received the instruction, starts or stops acquiring the history information. As illustrated in FIG. 7, the chip management board individually issues the above-described instruction to each chip via the history control wiring, so that a time difference in timing of the activation and deactivation of the history function between each chip becomes large.

For example, according to the study by the present inventor, a speed of communication used in serial communication using the history control wiring as a medium is approximately several hundred kbps. Therefore, the time difference occurs in reception timing of the instruction of the history function from the chip management board to each chip via the history control wiring being a low-speed signal interface between the chips. The time difference is significant when the communication speed of the main bus is approximately several hundred Mbps or higher. Since the history information collected by the chip management board from each chip is acquired during a time period between the activation and the deactivation of the history function by each chip, an information amount of the history information of the same period of time becomes smaller due to the time difference. That is, the history information of the same period of time used for specifying the error cause is smaller. As a result, when some error occurs in the information processing device and the error cause is specified via the PC, since the information amount of the collected history information is not sufficient, the user may require much effort to perform analyses and so on.

SUMMARY

A control circuit for receiving data transmitted by a data transmitting circuit and transmitting the received data to a data receiving circuit includes: a data receiving unit for receiving the data transmitted by the data transmitting circuit; a packet analyzing unit for judging whether the data received from the data transmitting circuit is a packet including history acquisition information in which an instruction for acquiring history information of transmission and reception of the data is set, and reading the history acquisition information from the received data upon judging that the received data is the packet including the history acquisition information; a history acquisition executing unit for starting or stopping acquiring the history information of the transmission and reception of the data according to the history acquisition information read by the packet analyzing unit to store the history information acquired; and a data transmitting unit for transmitting the packet including the history acquisition information or a packet other than the packet including the history acquisition information to the data receiving circuit.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 2 illustrates a configuration of a control circuit of the information processing device illustrated in FIG. 1;

FIG. 3 illustrates a bit definition of a trigger packet;

FIG. 4 illustrates operation timing of a history function;

DESCRIPTION OF EMBODIMENTS

Figure 1:
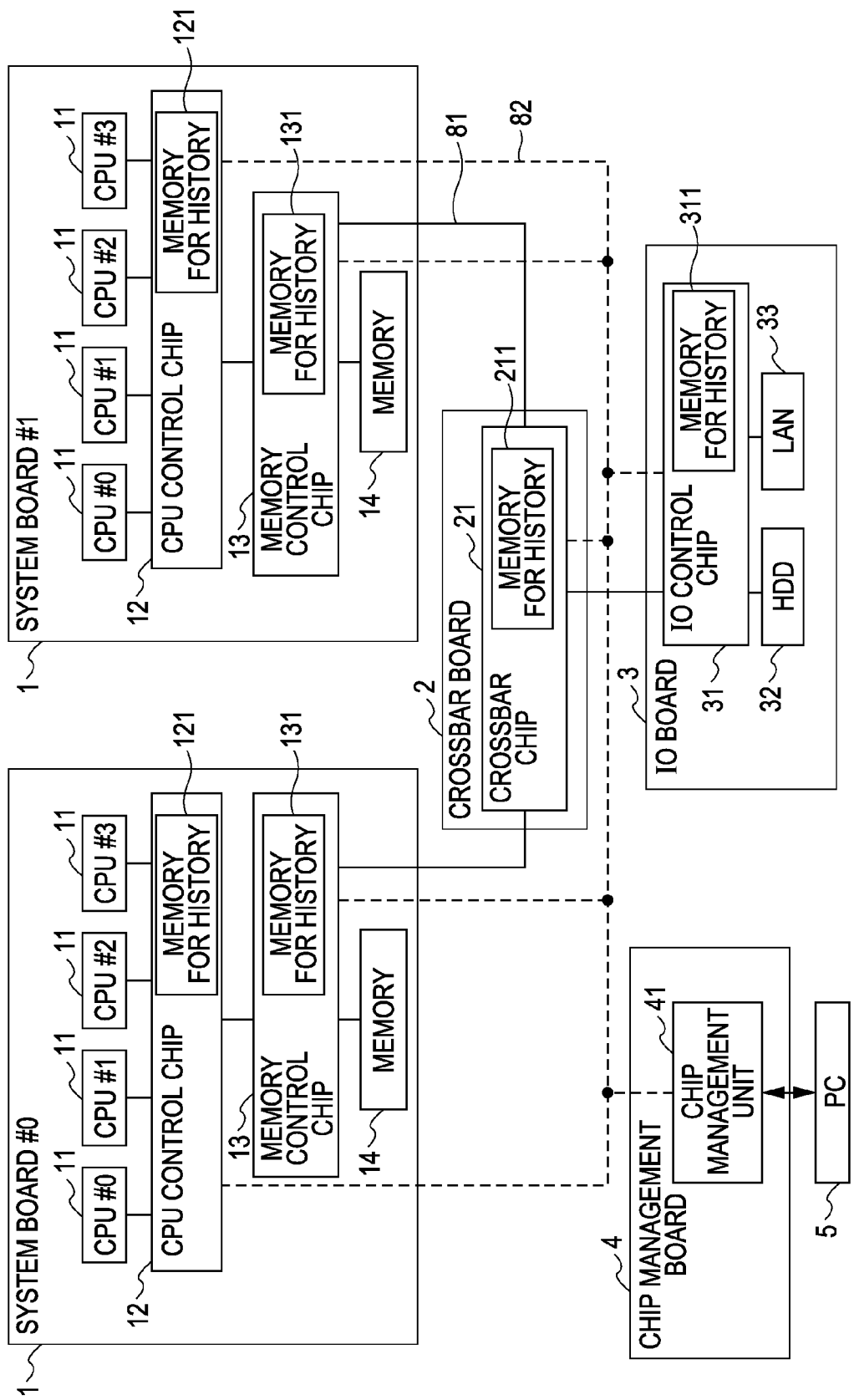
FIG. 1 illustrates a configuration of an information processing device according to one disclosed embodiment.

FIG. 1 illustrates a configuration of an embodiment of a multi CPU system.

The multi CPU system in FIG. 1 is provided with a plurality of CPU boards or system boards (board: mounting board) 1, a crossbar board 2, an IO (Input/Output) board 3, a chip management board 4, and a personal computer (PC) 5. When distinguishing a plurality of system boards 1, they are represented as a system board #0, a system board #1, and so on.

Each system board 1 is provided with a plurality of central processing units (CPUs) 11, a CPU control chip (LSI) 12, a memory control chip 13, and a memory 14. When distinguishing a plurality of CPUs 11, they are represented as a CPU #0, a CPU #1, and so on. The crossbar board 2 is provided with a crossbar chip 21. The IO board 3 is provided with an IO (Input/Output) control chip 31, and input/output devices, which are a hard disk drive (HDD) 32 and a local area network (LAN) 33 in the example in FIG. 1, are connected thereto. The chip management board 4 is provided with a chip management unit 41. The boards are mounting boards on which one or more chips are mounted, for example. The chips are LSI chips, for example. Each chip is provided with a memory for history (121, 131, 211 and 311) for storing acquired history information. For example, the CPU control chip 12 is provided with the memory for history 121.

In the multi CPU system in FIG. 1, a main bus 81 is indicated by a solid line. The main bus 81 is actually provided with a plurality of wirings, and connects the memory control chip 13 to the crossbar chip 21, for example. A trigger packet 71, defined as illustrated in FIG. 3, and a packet other than the trigger packet 71 are transmitted and received on the main bus 81. Meanwhile, the trigger packet 71 will be described later in detail.

In the multi CPU system in FIG. 1, a history control wiring 82 is indicated by a dotted line. The history control wiring 82 is a dedicated wiring for the history information provided independently of the main bus 81, and is the wiring which connects the memory control chips 13 of the system boards #0 and #1 to each other, for example. The history information is transmitted and received on the history control wiring 82. The history control wiring 82 is, for example, a serial wiring, and a signal speed thereof is lower than that of the main bus 81.

The system board 1 realizes a main function to execute arithmetic and control processes of data of an information processing device in FIG. 1. The system board 1 receives the data from another system board 1 or the IO board 3 via the crossbar board 2 to perform the above-described processes or the like. Also, the system board 1 transmits processed data or processing request data.

The CPU 11 is connected to the CPU control chip 12 via the main bus 81. The CPU 11 reads the data from the memory 14 or writes the data in the memory 14 via the CPU control chip 12, and executes various types of arithmetic operations and controls on the data.

The CPU control chip 12 is connected to the CPU 11, the memory control chip 13, and the like via the main bus 81. The CPU control chip 12 performs control when the CPU 11 transmits and receives the data to and from another CPU 11, the memory 14, and/or the crossbar chip 21. Also, the CPU control chip 12 stores the history information such as a destination, a recipient, a time, and a packet type of the data to be transmitted and received in the memory for history 121, and transmits (provides notification of) the history information stored in the memory for history 121 to the chip management unit 41 via the history control wiring 82, for example.

The memory control chip 13 is connected to the CPU control chip 12, the crossbar chip 21, and the memory 14 via the main bus 81. The memory control chip 13 reads the data from the memory 14 and/or writes the data in the memory 14. Also, the memory control chip 13 stores the history information of the transmission and reception of the data in the memory for history 131, and transmits the history information stored in the memory for history 131 to the chip management unit 41 via the history control wiring 82.

The memory 14 is connected to the memory control chip 13 via the main bus 81. The data on the memory 14 is read or written via the main bus 81 according to the control of the memory control chip 13.

The crossbar board 2 is provided with the crossbar chip 21, and transfers the data between the system boards 1 and the data between the system board 1 and the IO board 3 via the main bus 81.

The crossbar chip 21 is connected to the memory control chip 13 and the IO control chip 31 via the main bus 81. The crossbar chip 21 transmits and receives the data between the system board 1 and the IO board 3 and between a plurality of system boards 1. Also, the crossbar chip 21 stores the history information of the transmission and reception of the data in the memory for history 211. The crossbar chip 21 transmits the history information stored in the memory for history 211 to the chip management unit 41 via the history control wiring 82.

The IO board 3 is provided with the IO control chip 31. The IO control chip 31 transmits and receives the data between the crossbar chip 21 and the input/output devices connected to the IO board 3 via the main bus 81. The input/output devices are, for example, the HDD 32 and the LAN 33. Also, the IO control chip 31 stores the history information of the transmission and reception of the data in the memory for history 311, and transmits the history information stored in the memory for history 311 to the chip management unit 41 via the history control wiring 82. The multi CPU system in FIG. 1 is connected to another information processing device via the LAN 33. The input/output devices may be devices other than the HDD 32 and the LAN 33.

The chip management board 4 is provided with the chip management unit 41, and is connected to the chips 12, 13, 21, and 31 on the boards 1 to 3 via the history control wiring 82 by the chip management unit 41.

The chip management unit 41 is a history information management unit for notifying a PC 5, which is a system control device, of the history information collected from each unit of the multi CPU system. The chip management unit 41 transmits an instruction to collect the history information to each chip via the history control wiring 82. The chip management unit 41 collects the history information of the chips (12, 13, 21, and 31) of the boards 1 to 3, and stores the collected history information in a storage unit (not illustrated) to manage. The chip management board 4 is connected to the PC 5 and, when a user analyzes the history information, the chip management board 4 instructs the chips, which become starting points, to generate the trigger packet 71 according to a setting of the user to collect the history information from each chip. The chip management board 4 transmits the history information collected in this manner to the PC 5. When the user accesses the storage unit via the PC 5, the chip management unit 41 reads the stored history information from the storage unit and transmits the read history information to the PC 5.

The PC 5 is the system control device such as a service processor or a supervisor computer, and controls the multi CPU system in FIG. 1. The user accesses the chip management unit 41 of the chip management board 4 via the PC 5, and refers to the history information of the multi CPU system in FIG. 1 to perform analysis, maintenance, and the like of the same. Thus, the user may analyze a chip and/or a path in which an error occurs from the PC 5 based on the history information stored in the storage unit of the chip management unit 41.

FIG. 2 is a view illustrating a configuration of each chip 12, 13, 21, and 31 in the multi CPU system in FIG. 1.

In the information processing device, which is the multi CPU system in FIG. 1, assume that the memory control chip 13 of the system board #1 transmits the data to the memory control chip 13 of the system board #0 via the crossbar chip 21, for example. In this case, the memory control chip 13 of the system board #1 serves as a data transmitting circuit to transmit the data. The memory control chip 13 of the system board #0 serves as a data receiving circuit to receive the data. The crossbar chip 21 serves as a control circuit connected to the system boards #1 and #0 to receive the data transmitted by the system board #1, which is the data transmitting circuit, and transmit the received data to the system board #0, which is the data receiving circuit, to thereby acquire the history information of the data. Similarly, for other chips 12, 21, and 31, one serves as the data transmitting circuit, the data receiving circuit, or the control circuit for another, in the same manner.

Then, in order to simplify the description, the CPU control chip 12, the memory control chip 13, the crossbar chip 21, and the IO control chip 31 are generally referred to as simply a chip 61 in the following description.

In the information processing device, which is the multi CPU system in FIG. 1, each chip 61 is provided with a receiving circuit unit 611, a trigger packet judging unit 612, a chip function unit 613, a trigger packet analyzing unit 614, a history acquisition executing unit 615, a trigger packet generating unit 616, a chip initial setting unit 617, and a transmitting circuit unit 618.

The chip 61 receives the packet or the trigger packet 71 transmitted from another chip 61 and performs a specific process to the received packet or trigger packet 71, and thereafter, transmits the packet or the trigger packet 71 to another chip 61. Also, the chip 61 analyzes the received trigger packet 71 or generates a new trigger packet 71. The chip 61 transmits the history information (history data) to the chip management board 4. Herein, a format of the trigger packet 71 is a predetermined data format including information for acquiring the history information (history acquisition information) as illustrated in FIG. 3. Hereinafter, the packet other than the trigger packet 71 is simply referred to as "packet".

The receiving circuit unit 611 is a data receiving unit for receiving the data transmitted by the data transmitting circuit. As a result of error detection and error correction processes of the packet or the trigger packet 71 received from another chip (hereinafter, referred to as "error processing"), when there is an uncorrectable error, the receiving circuit unit 611 stores information including reception error information in the storage unit (not illustrated). Therefore, the receiving circuit unit 611 has an error detection function to execute the error detection and error correction processes.

The receiving circuit unit 611 transmits data obtained by performing the error processing to the received data to the trigger packet judging unit 612.

The trigger packet judging unit 612 judges whether the data transmitted from the receiving circuit unit 611 is the trigger packet 71 or the packet other than the trigger packet. When the trigger packet judging unit 612 judges that the data transmitted from the receiving circuit unit 611 is the packet other than the trigger packet 71, the trigger packet judging unit 612 transmits the packet to the chip function unit 613. When the trigger packet judging unit 612 judges that the data transmitted from the receiving circuit unit 611 is the trigger packet 71, the trigger packet judging unit 612 transmits the trigger packet 71 to the trigger packet analyzing unit 614. The trigger packet analyzing unit 614 judges the data to be the trigger packet 71 by header information of the trigger packet 71, for example.

The chip function unit 613 executes a process inherent in each chip 61 (chips 12, 13, 21, and 31). The chip function unit 613 receives the packet from the receiving circuit unit 611 via the trigger packet judging unit 612, executes the predetermined process to the received packet, and transmits the packet as the result of the process to the transmitting circuit unit 618.

The trigger packet analyzing unit 614 judges whether to activate or deactivate the history function and the like based on the information of the trigger packet 71 transmitted from the trigger packet judging unit 612. That is, the trigger packet analyzing unit 614 instructs the history acquisition executing unit 615 to start acquiring the history information (history activation) when information of history start/stop of the trigger packet 71 illustrated in FIG. 3 to be described below is history start. On the other hand, the trigger packet analyzing unit 614 instructs the history acquisition executing unit 615 to stop acquiring the history information (history deactivation) when the information of the history start/stop of the trigger packet 71 is history stop.

Also, the trigger packet analyzing unit 614 judges whether its own chip 61 is the chip to relay the trigger packet 71 or the chip of an ending point of the trigger packet 71 based on the information of the trigger packet 71. When the trigger packet analyzing unit 614 judges that its own chip 61 is not the chip of the ending point, that is, its own chip 61 is the chip to relay, the trigger packet analyzing unit 614 transmits the trigger packet 71 to the transmitting circuit unit 618. On the other hand, when the trigger packet analyzing unit 614 judges that its own chip 61 is the chip of the ending point of the trigger packet 71, the trigger packet analyzing unit 614 does not transmit the trigger packet 71 to the transmitting circuit unit 618. Then, the trigger packet analyzing unit 614 issues an instruction to the history acquisition executing unit 615 to transmit an arrival notification, indicating that the chip of the ending point has received the trigger packet 71, to the chip management board 4.

The trigger packet judging unit 612 and the trigger packet analyzing unit 614 correspond to a packet analyzing unit.

The history acquisition executing unit 615 starts or stops acquiring the history information according to the instruction of the history activation or history deactivation from the trigger packet analyzing unit 614. When the history acquisition executing unit 615 starts acquiring the history information, the history acquisition executing unit 615 acquires the history information including the destination, the recipient, the time, the packet type (such as memory read request), and the like relating to the packet received or the packet transmitted by the chip function unit 613.

Also, when the history acquisition executing unit 615 stops acquiring the history information, the history acquisition executing unit 615 does not acquire any history information until the next history information start. That is, the history acquisition executing unit 615 stores the history information acquired between the start and stop of the acquisition of the history information (during history operation illustrated in FIG. 4) in the memory for history (corresponding to 121, 131, 211 and 311 illustrated in FIG. 1). In this case, for example, when a storing location of the history information arrives at an ending address of the memory for history during the acquisition of the history information, the history acquisition executing unit 615 rewrites from a starting address of the memory for history for storing the latest history information.

The chip management board 4 is notified of an error occurrence in the control circuit by the history acquisition executing unit 615, which is notified of an error detection by the receiving circuit unit 611 of any chip 61, via the history control wiring 82. Thus, the chip management board 4 provides notification of generation of the trigger packet 71 for the history deactivation. Based on the trigger packet 71, the history acquisition executing unit 615 stops acquiring the history information after the error occurrence. Therefore, the history acquisition executing unit 615 may store the history information before and after the error occurrence.

When the history acquisition executing unit 615 receives the instruction of the above-described arrival notification from the trigger packet analyzing unit 614, the history acquisition executing unit 615 transmits the arrival notification to the chip management board 4 via the history control wiring 82. Thus, the chip management board 4 may judge that the trigger packet 71 is transferred between the chip 61 of the starting point and the chip 61 of the ending point after the generation notification of the trigger packet 71. When the chip management board 4 is not notified of the arrival from the chip 61 of the ending point after a specific time period, the chip management board 4 may perform again the process to transmit the generation notification of the trigger packet 71 to the chip 61 of the starting point.

The history acquisition executing unit 615 and the memory for history correspond to a history function executing unit which starts or stops acquiring the history information according to the history acquisition information to store the acquired history information.

When the trigger packet generating unit 616 receives the generation notification of the trigger packet 71 including the information of the history start from the chip management board 4 via the history control wiring 82, the trigger packet generating unit 616 generates a new trigger packet 71 in which the history acquisition information including the information of the history start is set according to the generation notification. Also, the trigger packet generating unit 616 instructs the history acquisition executing unit 615 to activate the history function (history activation). On the other hand, when the trigger packet generating unit 616 receives the generation notification of the trigger packet 71 including the information of the history stop from the chip management board 4 via the history control wiring 82, the trigger packet generating unit 616 generates a new trigger packet 71 in which the history acquisition information including the information of the history stop is set according to the generation notification. Also, the trigger packet generating unit 616 instructs the history acquisition executing unit 615 to deactivate the history. The trigger packet generating unit 616 transmits the trigger packet 71 thus generated to the transmitting circuit unit 618.

The trigger packet generating unit 616 corresponds to a packet generating unit for generating the packet including the history acquisition information (trigger packet 71).

The transmitting circuit unit 618 is a data transmitting unit for transmitting the data to another chip which becomes the data receiving circuit.

The transmitting circuit unit 618 receives the data of the trigger packet 71 from the trigger packet analyzing unit 614 or the trigger packet generating unit 616, or receives the data of the packet from the chip function unit 613. The transmitting circuit unit 618 performs an error correction code process on the received data and thereafter transmits the trigger packet 71 and/or the packet to another chip 61 as the transmitted data via the main bus 81.

The chip initial setting unit 617 sets chip information such as a board type and a board number of the board on which the chip initial setting unit 617 is mounted, and the number of the chip 61 as a part of the chip setting information, according to an instruction of the chip initial setting from the board on which the chip initial setting unit 617 is mounted. When the trigger packet analyzing unit 614 judges the chip information relating to its own chip 61 from the information of the trigger packet 71 based on the chip information set by the chip initial setting unit 617.

FIG. 3 is a view illustrating a bit definition of the trigger packet 71 used in the information processing device illustrated in FIG. 1.

In FIG. 3, the longitudinal axis represents each stage of the trigger packet 71. The trigger packet 71 includes, for example, bit strings of first to tenth stages. The abscissa axis represents a bit position in the bit string of each stage of the trigger packet 71. Each stage of the trigger packet 71 includes nine bits of bits 0 to 8, for example. The first stage of the trigger packet 71 is the header information, the second to ninth stages are the history acquisition information and the tenth stage is the error correction information.

In the first stage of the trigger packet 71, the bits 0 to 7 are header bits and the bit 8 is a parity bit of the bits 0 to 7. The parity bit is set such that the number of bits, which is 1, in the first stage becomes an even number, for example. The receiving circuit unit 611 may detect the presence of one-bit error in each data of each stage of the received trigger packet 71 with the parity bit. In the second to tenth stages of the trigger packet 71 also, the bit 8 is the parity bit.

In the second stage of the trigger packet 71, the bits 0 to 3 indicate the board type of the starting point and the bits 4 to 7 indicate the board number of the starting point. The board number of the starting point is the number of the board on which the chip 61, which generates the trigger packet 71, is mounted. The third stage of the trigger packet 71 indicates the chip number of the starting point. The chip number of the starting point is the number of the chip corresponding to the chip 61, which generates the trigger packet 71.

In the fourth stage of the trigger packet 71, the bits 0 to 3 indicate history of a transmission point of the starting point, and the bits 4 to 7 indicate history of a reception point of the starting point. The history of the transmission point of the starting point indicates a direction of the transmission, indicating to which of other chips 61 the chip 61 of the starting point transmits the packet. The history of the reception point of the starting point indicates a direction of the reception, indicating from which of the other chips 61 the chip 61 of the starting point receives the packet.

In the fifth stage of the trigger packet 71, the bits 0 to 3 indicate the board type of the ending point, and the bits 4 to 7 indicate the board number of the ending point. The board type and the board number of the ending point are the type and the number of the board of the ending point to which the trigger packet 71 is transferred. The sixth stage of the trigger packet 71 indicates the chip number of the ending point. The chip number of the ending point is the number of the chip corresponding to the chip 61 of the ending point to which the trigger packet 71 is transferred.

In the seventh stage of the trigger packet 71, the bits 0 to 3 indicate history of the transmission point of the ending point and the bits 4 to 7 indicate history of the reception point of the ending point. The history of the transmission point of the ending point indicates a direction of the transmission, indicating to which of the other chips 61 the chip 61 of the ending point transmits the packet. The history of the reception point of the ending point indicates a direction of the reception, indicating from which of the other chips 61 the chip 61 of the ending point receives the packet.

In the eighth stage of the trigger packet 71, the bits 0 to 7 indicate the history start/stop. The history start is the instruction to activate the history function (history activation) and the history stop is the instruction to deactivate the history function (history deactivation).

In the ninth stage of the trigger packet 71, the bits 0 to 7 indicate a history acquisition packet type. The history acquisition packet type indicates a type such as the read request or write request of the memory 14 for the packet transmitted and received by the chip 61.

In the tenth stage of the trigger packet 71, the bits 0 to 7 are the error correction bits, and the bit string to perform the error detection and the error correction of an entire trigger packet 71 by Error Check and Correction (ECC), for example. Based on the data of the tenth stage of the trigger packet 71, the chip 61 performs one-bit error correction and two-bit error detection for the received trigger packet 71.

The transmitting circuit unit 618 in the chip 61 generates the error detection and correction codes for the first to ninth stages of the trigger packet 71. The transmitting circuit unit 618 inserts the data of a generation result as information of the tenth stage of the trigger packet 71. Thus, the receiving circuit unit 611 of the chip 61, which receives the trigger packet 71, executes the above-described error correction or error detection based on the tenth stage of the trigger packet 71.

As an example of the information of the trigger packet 71, it may be set that the board type of the starting point=the system board, the board number of the starting point=0, the chip number of the starting point=12, the history of the transmission point of the starting point=12→13 (the CPU control chip 12→the memory control chip 13), and the history of the reception point of the starting point=13→12. Also, similarly, it may be set that the board type of the ending point=the system board, the board number of the ending point=1, the chip number of the ending point=12, the history of the transmission point of the ending point=13→12, the history of the reception point of the ending point=12→13, the history start/stop=start and the history acquisition packet type=the read instruction of the memory 14. The chip 61 sets the pieces of information in the trigger packet 71 in a format defined as the data in advance.

FIG. 4 illustrates an example of operation timing of the history function of each chip 61.

The timing illustrated in FIG. 4 is an example of a case of a process in which the CPU #3 of the system board #1 requests reading of the memory 14 of the system board #0, and thereafter the CPU control chip 12 of the system board #1 transmits the packet to the system board #0. In this case, after activating a power source of the information processing device (a), the chip management board 4 notifies the chip 61, which becomes the starting point, of the generation instruction of the trigger packet 71 including the information of the history start (b).

The chip 61, which becomes the starting point, receives the generation notification from the chip management board 4. That is, when the CPU control chip 12 of the system board #1 receives the generation notification of the trigger packet 71 including the information of the history start from the chip management board 4 (a rising edge of a square wave in (d)), the CPU control chip 12 generates the trigger packet 71 including the information of the history start. The CPU control chip 12 sets the information obtained by associating the board type and the board number of the starting point with the system board #1 and associating the chip number of the starting point with the CPU control chip 12 in the trigger packet 71. Similarly, the CPU control chip 12 sets the information obtained by associating the board type and the board number of the ending point with the system board #0, and associating the chip number of the ending point with the CPU control chip 12 in the trigger packet 71. The CPU control chip 12 of the system board #1 transmits the generated trigger packet 71 to the memory control chip 13 of the system board #1 via the main bus 81. Then, the CPU control chip 12 activates the history function after transmitting the trigger packet 71.

When the memory control chip 13 of the system board #1 receives the trigger packet 71 from the CPU control chip 12 (the rising edge of the square wave in (e)), the memory control chip 13 activates the history function based on the information of the history start of the received trigger packet 71.

Hereinafter, similarly, the operation process is performed at the timing of the rising edge of the square wave in (f) to (h) illustrated in FIG. 4 in each chip 61 between the starting point and the ending point in which the trigger packet 71 is transferred.

After the above-described operation, the chip management board 4 notifies the chip 61, which becomes the starting point, of the generation instruction of the trigger packet 71 including the information of the history stop (c).

The chip 61, which becomes the starting point, receives the generation notification from the chip management board 4. That is, when the CPU control chip 12 of the system board #1 receives the generation notification of the trigger packet 71 including the information of the history stop from the chip management board 4 (a falling edge of the square wave in (d)), the CPU control chip 12 generates the trigger packet 71 including the information of the history stop. Then, the CPU control chip 12 transmits the trigger packet 71 and thereafter deactivates the history function.

Hereinafter, as in the case of the transmission of the trigger packet 71 including the information of the above-described history start, the chip 61 sequentially transmits the trigger packet 71 including the information of the history stop to another chip 61. Another chip 61, which has received the trigger packet 71, deactivates the history function (the falling edge of each square wave in (e) to (h)).

As described above, according to the multi CPU system being one embodiment of this disclosure, the chip 61 may notify another chip 61, which becomes the starting point of the trigger packet, of the activation and deactivation of the history function using the trigger packet 71 via the main bus 81. Thus, each chip 61, which has received the notification from the trigger packet 71, may judge whether to activate or deactivate the history function. Therefore, the chip management board 4 does not have to perform communication of the activation and deactivation instruction of the history function with the other chip 61, which becomes the starting point of the trigger packet, via the history control wiring 82.

For example, a speed of the communication using the main bus 81 as a medium is approximately several hundred Mbps or faster, and this is approximately a thousand times higher than that of the history control wiring 82 whose communication speed is approximately several hundred Kbps. Since each chip 61 may transmit and receive the activation instruction and the deactivation instruction of the history function to and from another chip 61 via the main bus 81 capable of high-speed processing, each chip 61 may acquire more history information of substantially the same period of time to store in the memory for history.

In this manner, the chip management board 4 may collect the history information of the same period of time of each chip 61. As a result, the user may use the history information as the information effective for the error analysis and the like via the PC 5.

Figure 5:
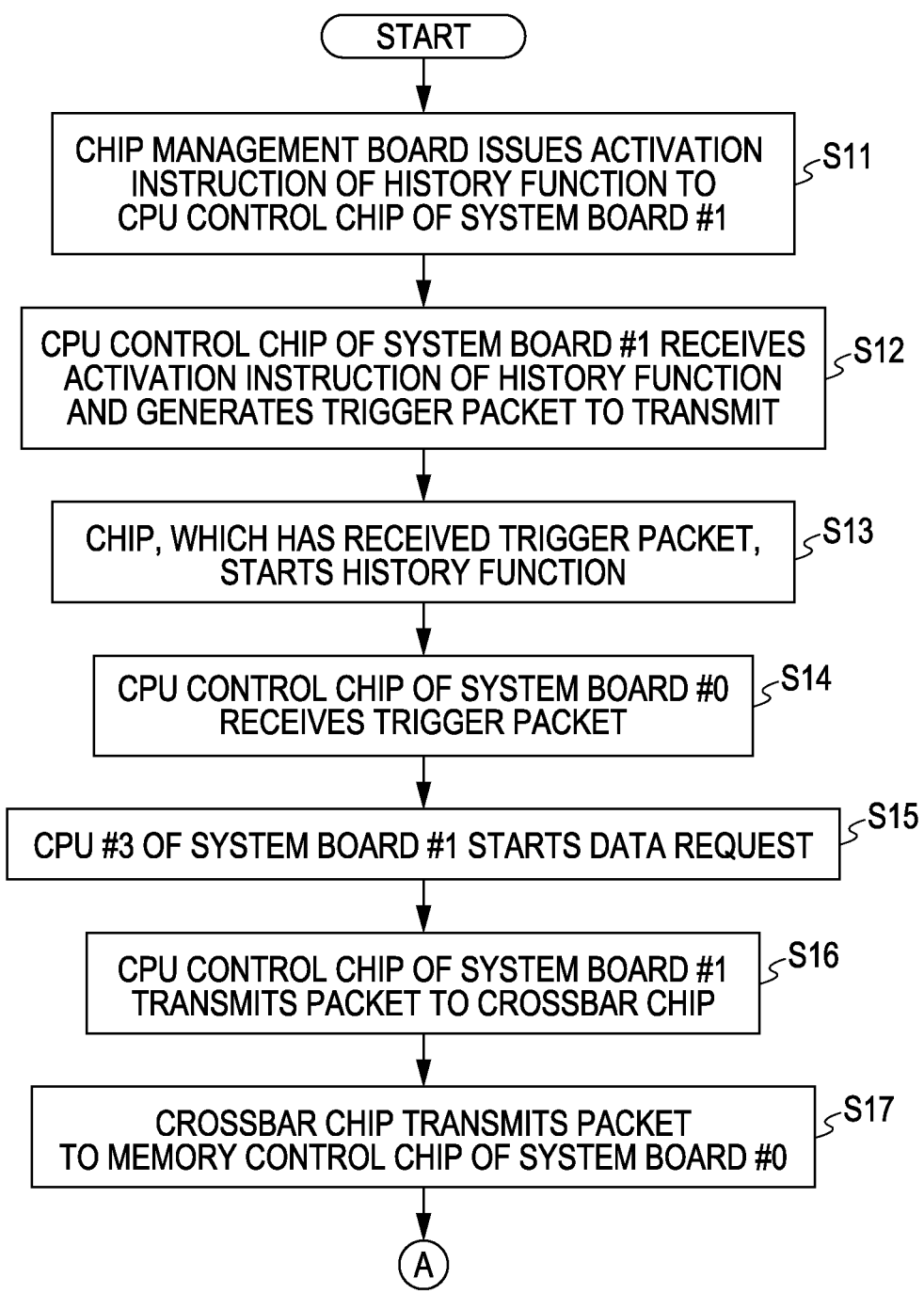
FIG. 5 illustrates a process flow of the history function by the trigger packet.
Figure 6:
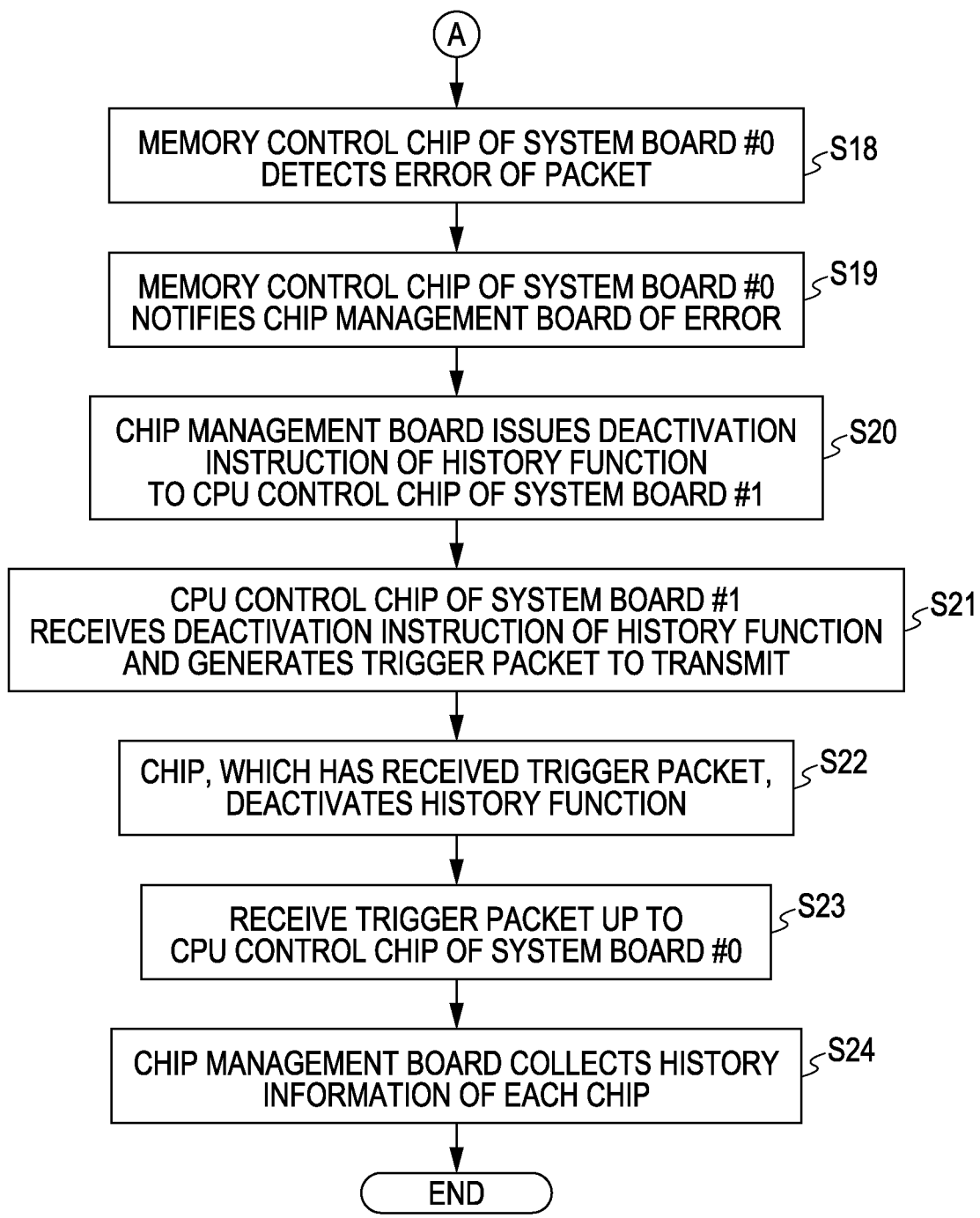
FIG. 6 illustrates the process flow of the history function by the trigger packet.
Figure 7:
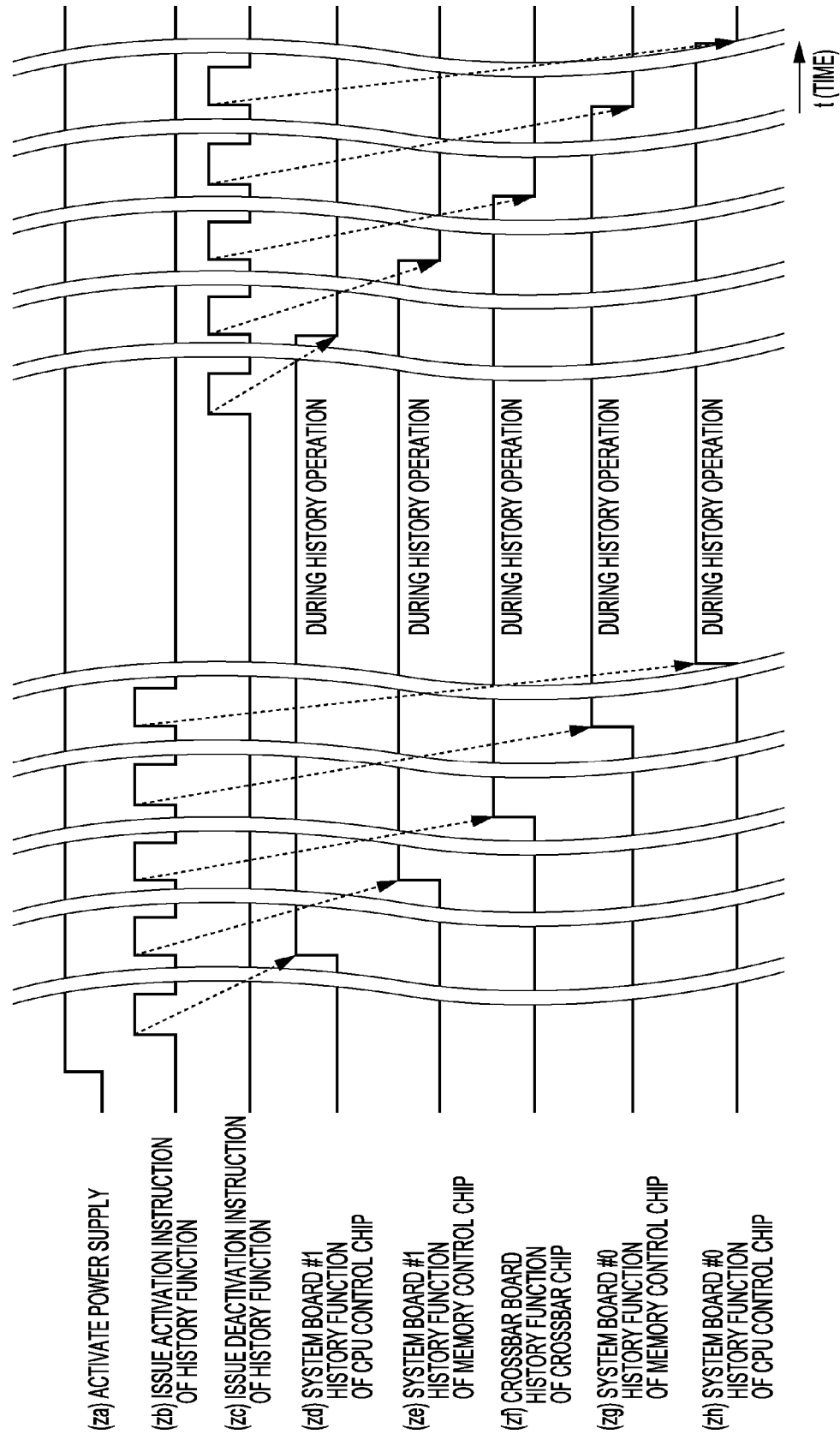
FIG. 7 illustrates a process of the history function.
Figure 8:
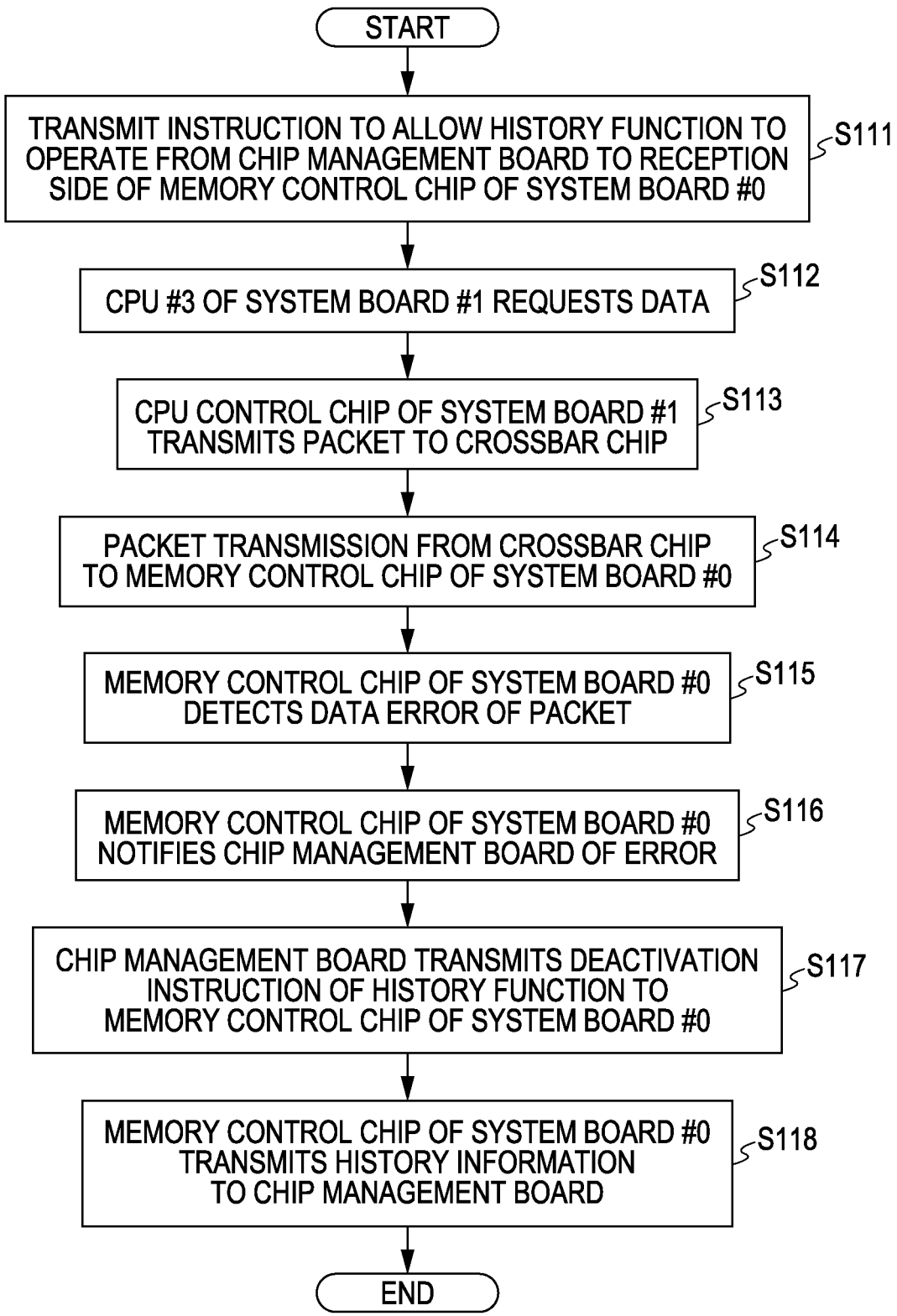
FIG. 8 illustrates the process of the history function.

FIGS. 5 and 6 are views for illustrating the process of the history function by the trigger packet 71. The process in FIGS. 5 and 6 is an example of a case in which the CPU #3 of the system board #1 requests the read of the memory 14 of the system board #0, and thereafter the CPU control chip 12 of the system board #1 transmits the packet to the system board #0.

The chip management board 4 issues (transmits) the activation instruction of the history function to the CPU control chip 12 of the system board #1 via the history control wiring 82 (S11). The CPU control chip 12, which has received the activation instruction from the chip management board 4, sets the history start as the information of the history start/stop, generates the trigger packet 71 including the information, and transmits the trigger packet 71 to the memory control chip 13 via the main bus 81 (S12). After S12, the chip 61, which has received the trigger packet 71, activates the history function based on the trigger packet 71 (S13).

The CPU control chip 12 of the system board #0 receives the trigger packet 71 including the information of the history start via the main bus 81 (S14).

The CPU #3 of the system board #1 requests the data (S15). The CPU control chip 12 of the system board #1 transmits the packet to the crossbar chip 21 via the main bus 81 (S16). The crossbar chip 21, which has received the packet from the system board #1, transmits the packet to the memory control chip 13 of the system board #0 via the main bus 81 (S17).

Assume that the memory control chip 13 of the system board #0 receives the packet and detects an error of the packet (S18). In this case, the memory control chip 13 of the system board #0 notifies the chip management board 4 of the error via the history control wiring 82 (S19).

The chip management board 4, which has received the error notification from the system board #0, transmits the deactivation instruction of the history function to the CPU control chip 12 of the system board #1 via the history control wiring 82 (S20). The CPU control chip 12, which has received the deactivation instruction from the chip management board 4, sets the history stop as the information of the history start/stop, generates the trigger packet 71 including the history acquisition information, and transmits the trigger packet 71 to the memory control chip 13 via the main bus 81 (S21).

Hereinafter, the chip 61, which has received the trigger packet 71, deactivates the history function (S22). The trigger packet 71 up to the CPU control chip 12 of the system board #0, which becomes the ending point of the transfer of the trigger packet 71, is received (S23).

The CPU control chip 12 of the system board #0 judges that the chip itself is the chip of the ending point based on the received trigger packet 71, and notifies the chip management board 4 of the arrival of the trigger packet 71 via the history control wiring 82. When the chip management board 4 receives the notification from the system board #0, the chip management board 4 notifies each corresponding chip 61 of the transmission instruction of the history information. Each chip 61, which has received the instruction from the chip management board 4, transmits the acquired history information to the chip management board 4. The chip management board 4 collects the history information from each chip 61 via the history control wiring 82 (S24).

As described above, the chip management board 4 allows the CPU control chip 12 of the system board #1 to generate the trigger packet 71, and the chip 61 on the path to the CPU control chip 12 of the system board #0 allows the history function to operate based on the trigger packet 71. Thus, the chip management unit 41 may collect the history information acquired by each chip 61 via the history control wiring 82. As a result, the user may use the pieces of history information as the information effective for the error analysis and the like via the PC 5.

What is claimed is:

1. A control circuit for receiving data transmitted by a data transmitting circuit and transmitting the received data to a data receiving circuit, the control circuit comprising:
a data receiving unit for receiving data transmitted by the data transmitting circuit;
a packet analyzing unit for judging whether the data received from the data transmitting circuit is a packet including history acquisition information in which an instruction for acquiring history information of transmission and reception of the data is set, and reading the history acquisition information from the received data upon judging that the received data is the packet including the history acquisition information;
a history acquisition executing unit for starting or stopping acquiring the history information of the transmission and reception of the data according to the history acquisition information read by the packet analyzing unit to store the history information acquired; and
a data transmitting unit for transmitting the packet including the history acquisition information or a packet other than the packet including the history acquisition information to the data receiving circuit.

2. The control circuit according to claim 1, wherein
the history acquisition information includes information to specify a control circuit of an ending point for stopping transfer of the packet including the history acquisition information, and
the packet analyzing unit judges whether its own control circuit is the control circuit of the ending point based on the history acquisition information, transmits the packet including the history acquisition information to the data transmitting unit upon judging that its own control circuit is not the control circuit of the ending point, and does not transmit the packet including the history acquisition information to the data transmitting unit upon judging that its own control circuit is the control circuit of the ending point.

3. An information processing device comprising:
a data transmitting circuit for transmitting data;
a data receiving circuit for receiving the data; and
a control circuit connected to the data transmitting circuit and the data receiving circuit,
wherein the control circuit includes:
a data receiving unit for receiving data transmitted by the data transmitting circuit;
a packet analyzing unit for judging whether the data received from the data transmitting circuit is a packet including history acquisition information in which an instruction for acquiring history information of transmission and reception of the data is set, and reading the history acquisition information from the received data upon judging that the received data is the packet including the history acquisition information;
a history acquisition executing unit for starting or stopping acquiring the history information of the transmission and reception of the data according to the history acquisition information read by the packet analyzing unit to store the history information acquired; and
a data transmitting unit for transmitting the packet including the history acquisition information or a packet other than the packet including the history acquisition information to the data receiving circuit as the received data.

4. The information processing device according to claim 3, wherein
the history acquisition information includes information to specify the control circuit which becomes an ending point to stop transfer of the packet including the history acquisition information, and
the packet analyzing unit transmits the packet including the history acquisition information to the data transmitting unit upon judging that its own control circuit is not the control circuit of the ending point, and does not transmit the packet including the history acquisition information to the data transmitting unit upon judging that its own control circuit is the control circuit of the ending point, based on the history acquisition information.

5. The information processing device according to claim 3, further comprising:
a history information management unit connected to the control circuit for transmitting control information to the control circuit and collecting the history information acquired by the control circuit,
wherein the control circuit further includes a history information notifying unit for transmitting the acquired history information to the history information management unit based on the control information of the history information management unit.

6. The information processing device according to claim 5, wherein
the control circuit includes a packet generating unit for generating a packet in which the history acquisition information is set based on the control information of the history information management unit.

7. A method of controlling an information processing device having a data transmitting circuit for transmitting data, a data receiving circuit for receiving the data, and a control circuit connected to the data transmitting circuit and the data receiving circuit, the method comprising:

receiving the data transmitted by the data transmitting circuit;

judging, by the packet analyzing unit of the control circuit, whether the received data is a packet including history acquisition information in which an instruction for acquiring history information of transmission and reception is set, reading the history acquisition information from the received data upon judging that the received data is the packet including the history acquisition information;

starting or stopping acquiring the history information of the transmission and reception of the data according to the history acquisition information read by the packet analyzing unit to store the history information acquired; and transmitting the packet including the history acquisition information or a packet other than the packet including the history acquisition information to the data receiving circuit as the received data.

8. The method of controlling the information processing device according to claim 7, wherein the history acquisition information includes information to specify the control circuit which becomes an ending point to stop transfer of the packet including the history acquisition information, and the packet analyzing unit transmits the packet including the history acquisition information to the data transmitting unit upon judging that its own control circuit is not the control circuit of the ending point, and does not transmit the packet including the history acquisition information to the data transmitting unit upon judging that its own control circuit is the control circuit of the ending point, based on the read history acquisition information, at a process step to read the history acquisition information.

9. The method of controlling an information processing device according to claim 7, wherein the information processing device further includes a history information management unit connected to the control circuit for transmitting the control information to the control circuit and collecting the history information acquired by the control circuit, and the method of controlling an information processing device further includes:

transmitting, by a history information notifying unit, the acquired history information to the history information management unit based on the control information.

10. The method of controlling an information processing device according to claim 7, wherein a packet generating unit of the control circuit generates a packet in which the history acquisition information is set based on control information of the history information management unit.

* * * * *